United States Patent [19]

Mashimo

[11] Patent Number: 4,896,221

[45] Date of Patent: Jan. 23, 1990

[54] OPTICAL DISC REPRODUCING APPARATUS HAVING SPEED-CHANGE REPRODUCTION MODE

[75] Inventor: Akira Mashimo, Tokorozawa, Japan

[73] Assignee: TEAC Corporation, Japan

[21] Appl. No.: 208,879

[22] Filed: Jun. 20, 1988

[30] Foreign Application Priority Data

Jun. 23, 1987 [JP] Japan .................................. 62-156254

[51] Int. Cl.$^4$ .................................................. G11B 7/00
[52] U.S. Cl. ...................................... 358/342; 369/32; 369/44; 360/73.03; 360/10.1
[58] Field of Search .................................. 358/342, 335; 369/43–47, 32, 33; 250/201; 360/10.1, 10.2, 35.1, 73.03

[56] References Cited

U.S. PATENT DOCUMENTS 4,598,394 7/1986 Nonaka .................................. 369/44
4,646,280 2/1987 Toyosawa .............................. 369/50

Primary Examiner—Robert L. Richardson
Attorney, Agent, or Firm—Andrus, Sceales, Starke & Sawall

[57] ABSTRACT

An optical disc reproducing apparatus reproduces a pre-recorded signal from an intended track of an optical disc by detecting reflected light beams to main and sub light beams reflected from the optical disc, where the main light beam is irradiated as a main beam spot on the track while the sub light beams are irradiated as sub beam spots at intermediate portions between two successive tracks one of which is the intended track. The main beam spot jumps from the intended track to an adjacent track at a predetermined rate while maintaining a relative positional relationship of the main and sub beam spots in a speed-change mode. The optical disc reproducing apparatus comprises terminals for receiving first and second reproduced signals detected from the reflected light beams of the main light beam and at least one of the sub light beams reflected from the optical disc, a delay part for matching timings of the first and second reproduced signals by delaying at least one of the two signals, and a selecting part supplied with the first and second reproduced signals from the delay part for selectively outputting the first reproduced signal during a time when no jump is made and for selectively outputting the second reproduced signal for a predetermined time after a jump starts.

11 Claims, 3 Drawing Sheets

OPTICAL DISC REPRODUCING APPARATUS HAVING SPEED-CHANGE REPRODUCTION MODE

BACKGROUND OF THE INVENTION

The present invention generally relates to optical disc reproducing apparatuses, and more particularly to an optical disc reproducing apparatus having a speed-change reproduction mode.

Conventionally, it is known that a speed-change reproduction is achieved by forcibly changing at a predetermined rate a scanning position (or reproducing position) of an optical head which reproduces pre-recorded video signals from an optical disc. This forced change in the scanning position of the optical head will hereinafter simply be referred to as a "jump" in the present specification. When it is assumed that the optical disc is pre-recorded in a normal recording mode, it is possible to play the optical disc in an n-times forward high-speed reproduction mode by making the optical head jump $(n-1)$ times in a forward direction per revolution of the optical disc. Similarly, it is possible to play the optical disc in an n-times reverse high-speed reproduction mode by making the optical head jump $(n+1)$ times in a reverse direction per revolution of the optical disc.

On the other hand, as an example of the conventional optical disc reproducing apparatus, there is a known optical disc reproducing apparatus which employs three light beams (beam spots) to reproduce pre-recorded signals from the optical disc. Out of the three light beams, one is a main light beam which is a zeroth diffraction light obtained from a diffraction grating, and the remaining two are sub light beams for control which are positive first diffraction light and negative first diffraction light obtained by the diffraction grating. Out of these three light beams, the main light beam is irradiated on a track which is to be scanned. On the other hand, the two sub light beams are respectively irradiated on opposite sides of the track scanned by the main light beam, that is, each sub light beam is irradiated on an intermediate portion between two successive tracks. In addition, the two sub light beams are respectively positioned ahead and behind the main light beam in the scanning direction.

According to this optical disc reproducing apparatus, it is possible to reproduce the pre-recorded information signal from the track by the main light beam (zeroth diffraction light). It is also possible to detect a focus error signal by the astigmatism method using a reflected light of the main beam, and in addition, it is possible to carry out a tracking control of the optical head based on reflected lights of the two sub light beams (positive and negative first diffraction lights).

When this optical disc reproducing apparatus plays the optical disc in the speed-change reproduction mode such as a high-speed reproduction mode and a still picture reproduction mode, the three light beams jump but the relative positional relationship of the three light beams are maintained constant.

FIGS. 1A through 1C are plan views of the optical disc showing the tracks on an enlarged scale, and the tracks may be concentric tracks or track portions of a single spiral track. For example, a video signal is pre-recorded on each track constituted by a row of intermittent pits. FIGS. 1A through 1C each show portions of three such consecutive tracks TR1, TR2 and TR3. It will be assumed for convenience' sake that a beam spot M of the main light beam jumps from the track TR2 constituted by a row of intermittent pits 1 to the track TR1 constituted by a row of intermittent pits 2. The track TR3 is constituted by a row of intermittent pits 3.

First, as shown in FIG. 1A, the beam spot M of the main light beam scans the track TR2 while a beam spot S1 of a first sub light beam scans an intermediate portion between the tracks TR1 and TR2 at a position leading the beam spot M by a time T in the scanning direction and a beam spot S2 of a second sub light beams scans an intermediate portion between the tracks TR2 and TR3 at a position lagging the beam spot M by a time T in the scanning direction.

When the beam spot M jumps from the track TR2 to the track TR1, the beam spots M, S1 and S2 take the positions shown in FIG. 1B before reaching the positions shown in FIG. 1C. In FIG. 1B, the beam spot M scans the intermediate portion between the tracks TR1 and TR2 while the beam spot S1 scans the track TR1 at a position leading the beam spot M by a time T in the scanning direction and the beam spot S2 scans the track TR2 at a position lagging the beam spot M by a time T in the scanning direction. On the other hand, in FIG. 1C, the beam spot M scans the intended track TR1 while the beam spot S1 scans an intermediate portion between the track TR1 and a track (not shown) adjacent thereto at a position leading the beam spot M by a time T in the scanning direction and the beam spot S2 scans the intermediate portion between the tracks TR1 and TR2 at a position lagging the beam spot M by a time T in the scanning direction.

When the beam spot M jumps from the track TR2 to the track TR1, the reproduced signal from the optical disc switches from a reproduced video signal from the track TR2 to a reproduced video signal from the track TR1. However, in the state shown in FIG. 1B before the beam spot M reaches the track TR1, the beam spot M scans the intermediate portion between the tracks TR1 and TR2. No reproduced video signal is obtained from this intermediate portion because the beam spot M scans neither the track TR2 nor the track TR1. As a result, a noise is generated in the reproduced picture for a duration of approximately one horizontal scanning period to ten odd horizontal scanning periods of the video signal per jump.

The noise caused by the jump can be made inconspicuous in the reproduced picture by carrying out the jump within a vertical blanking period of the video signal. For this reason, the noise is not a problem when playing the optical disc in the still picture reproduction mode and the high-speed reproduction mode (for example, a two-times speed mode) which carries out a relatively small number of jumps per revolution of the optical disc. However, when the number of jumps per revolution of the optical disc increases in the high-speed reproduction mode (for example, a ten-times speed mode), it no longer becomes possible to guarantee the jump within the vertical blanking period because a time interval of the jumps is restricted by conditions such as the mass of an actuator which displaces the optical head. In other words, as the number of jumps becomes large per revolution of the optical disc, it becomes impossible to mechanically cope with the extremely short time interval of the jumps so that each jump is within the vertical blanking period. For example, in the ten-times speed mode, a jump may occur at a central portion of one field, that is, the central portion of the picture. In this case, there is a problem in that the noise caused by the jump appears conspicuously at a central portion of the reproduced picture.

SUMMARY OF THE INVENTION

Accordingly, it is a general object of the present invention to provide a novel and useful optical disc reproducing apparatus in which the problems described heretofore are eliminated.

Another and more specific object of the present invention is to provide an optical disc reproducing apparatus capable of compensating for a level decrease in a reproduced signal during a jump from one track to another track on an optical disc.

Still another object of the present invention is to provide an optical disc reproducing apparatus for reproducing a pre-recorded signal from an intended track of an optical disc by detecting reflected light beams of a main light beam and sub light beams reflected from the optical disc, where the main light beam is irradiated as a main beam spot on the track while the sub light beams are irradiated as sub beam spots at intermediate portions between two successive tracks one of which is the intended track. The optical disc reproducing apparatus has a speed-change reproduction mode in which the main beam spot jumps from the intended track to an adjacent track at a predetermined rate while maintaining a relative positional relationship of the main beam spot and the sub beam spots, and comprises a first input terminal for receiving a first reproduced signal detected from the reflected light beam of the main light beam reflected from the optical disc, a second input terminal for receiving at least a second reproduced signal detected from the reflected light beam of one of the sub light beams reflected from the optical disc, a delay part for matching timings of the first and second reproduced signals by delaying at least one of the first and second reproduced signals, and a selecting part supplied with the first and second reproduced signals from the delay part for selectively outputting the first reproduced signal during a time when no jump is made and for selectively outputting the second reproduced signal for a predetermined time after a jump starts. According to the optical disc reproducing apparatus of the present invention, it is possible to effectively compensate for the decrease in the reproduced signal level when the main beam spot jumps, thereby considerably reducing the generation of noise caused by the jump.

Other objects and further features of the present invention will be apparent from the following detailed description when read in conjunction with the accompanying drawings.

DETAILED DESCRIPTION

Figure 1A:
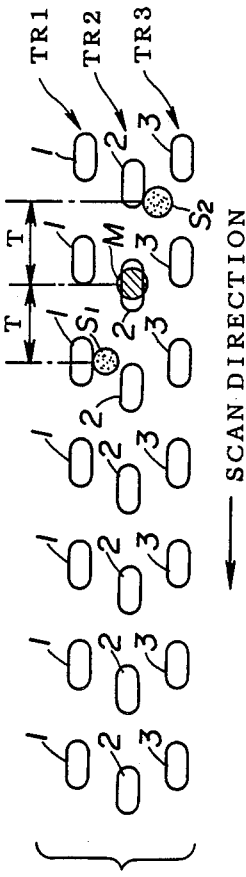
FIGS. 1A through 1C are plan views respectively showing portions of three consecutive tracks of an optical disc on an enlarged scale for explaining a jump of a main beam spot of a main light beam.
Figure 1B:
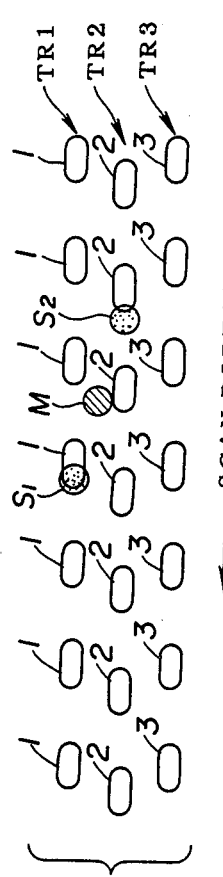
Figure 1C:
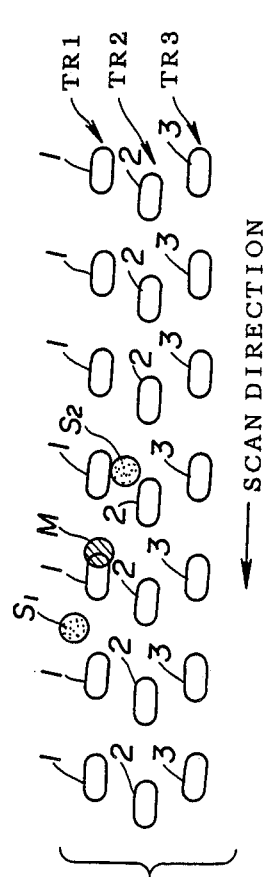
Figure 2:
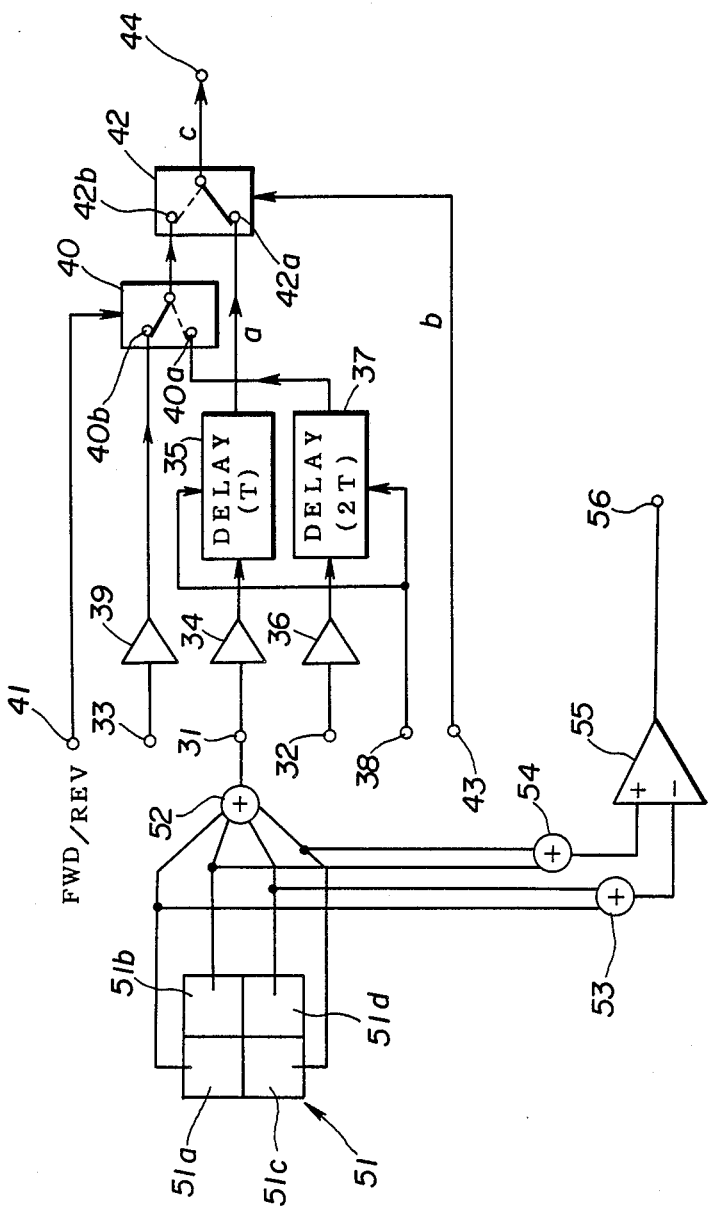
FIG. 2 is a system block diagram showing an embodiment of an essential part of the optical disc reproducing apparatus according to the present invention.

FIG. 2 shows an essential part of an embodiment of the optical disc reproducing apparatus according to the present invention. A first reproduced radio frequency (RF) signal is applied to an input terminal 31, while second reproduced RF signals are applied to input terminals 32 and 33. The first reproduced RF signal is obtained by subjecting a reflected light of a beam spot of a main light beam to a photoelectric conversion. The beam spot of the main light beam corresponds to the beam spot M described before in conjunction with FIGS. 1A through 1C. On the other hand, the second reproduced RF signals are obtained by subjected reflected lights of beam spots of sub light beams to a photoelectric conversion. The beam spots of the sub light beams correspond to the beam spots S1 and S2 described before in conjunction with FIGS. 1A through 1C. However, in a normal reproduction mode, the levels of the second reproduced RF signals are considerably small compared to the level of the first reproduced RF signal.

Because the relative positional relationship of the beam spot of the main light beam and the beam spots of the sub light beams is the same as that shown in FIGS. 1A through 1C, the present embodiment will be described by also referring to FIGS. 1A through 1C.

The first reproduced RF signal is obtained from an adder 52 which adds detection outputs of light detecting surfaces 51a through 51d of a four-division photodetector 51. The detection outputs of the diagonally arranged light detecting surfaces 51a and 51d are added in an adder 53, while the detection outputs of the diagonally arranged light detecting surfaces 51b and 51c are added in an adder 54. Outputs of the adders 53 and 54 are supplied to a differential amplifier 55, and an output signal of the differential amplifier 55 is outputted from a terminal 56 as a focus error signal. This focus error signal is supplied to a focus control system (not shown) for controlling the focus state of the beam spot M.

The first reproduced RF signal from the input terminal 31 is passed through an amplifier 34 and is delayed by a delay time T shown in FIG. 1A in a delay circuit 35. At the same time, the second reproduced RF signal from the input terminal 32 is passed through an amplifier 36 and is delayed by a delay time 2T in a delay circuit 37. On the other hand, the second reproduced RF signal from the input terminal 33 is passed through an amplifier 39 and is applied to a terminal 40b of a switching circuit 40. An output signal of the delay circuit 37 is applied to a terminal 40a of the switching circuit 40. An output signal of the switching circuit 40 is applied to a terminal 42b of a switching circuit 42, and an output signal of the delay circuit 35 is applied to a terminal 42a of the switching circuit 42.

Accordingly, at the output of the amplifier 39 and the outputs of the delay circuits 35 and 37, the timings of the three kinds of reproduced RF signals are matched to the reproducing time of the beam spot S2 of the sub light beam.

When the optical disc is a constant angular velocity (CAV) system disc, the relative linear velocity between the scanning beam spot and the optical disc changes depending on a radial position of the scanning beam spot on the optical disc. In this case, the time difference T between the beam spots M and S1 and the time difference 2T between the beam spots S2 and S1 change depending on the radial position on the optical disc.

Accordingly, a control signal indicative of the radial position of the beam spot M on the optical disc is applied to an input terminal 38 and supplied to the delay circuits 35 and 37 so as to variably control the delay times of the delay circuits 35 and 37. In this case, the delay times are variably controlled to decrease as the beam spot M moves further away from a center of the optical disc.

Figure 3:
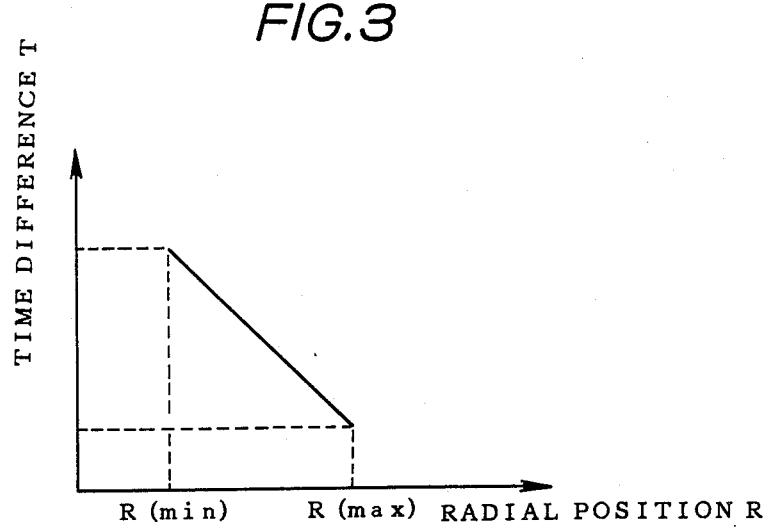
FIG. 3 shows the relationship between the radial position on the CAV system optical disc and the time difference of the beam spots.

FIG. 3 shows the relationship between the radial position of the beam spot M on the CAV system optical disc and the time difference T of the beam spots M and S1 (or S2). When a distance between the beam spots M and S1 (or S2) is denoted by L, a radial position of a beam spot M on the optical disc is denoted by R, and a rotation period of the optical disc is denoted by t, the time difference T can be described by $T = t \times L / 2\pi R$. In other words, in the case of the CAV system optical disc, the time difference T decreases from an innermost radius R(min) toward an outermost radius R(max) of the optical disc.

On the other hand, when the optical disc is a constant linear velocity (CLV) system disc, the relative linear velocity between the scanning beam spot and the optical disc is constant regardless of the radial position of the scanning beam spot on the optical disc. In this case, a control signal applied to the input terminal 38 is supplied to the delay circuits 35 and 37 so as to fix the delay times thereof.

The switching circuit 40 is controlled by a jump direction instruction signal (FWD/REV) applied to an input terminal 41. When jumping in a forward direction (FWD), the switching circuit 40 is controlled to selectively pass the second reproduced RF signal from the delay circuit 37 responsive to the jump direction instruction signal. The switching circuit 40 is controlled to selectively pass the second reproduced RF signal from the amplifier 39 responsive to the jump direction instruction signal when jumping in a reverse direction (REV). The switching circuit 40 may be controlled to pass the second reproduced RF signal from the amplified 39 when jumping in the forward direction and to pass the second reproduced RF signal from the delay circuit 37 when jumping in the reverse direction. Furthermore, it is possible to omit the switching circuit 40, and fixedly supply either one of the second reproduced RF signals from the amplifier 39 and the delay circuit 37 to the terminal 42b of the switching circuit 42.

The switching circuit 42 selectively passes the output signal of the switching circuit 40 or the output signal of the delay circuit 35 responsive to a switching signal applied to an input terminal 43. The switching signal in the present embodiment is a pulse signal b shown in FIG. 4(B) which has a high level only for a predetermined time To immediately after a jumping signal which instructs a jump. This switching signal b can be produced based on the jumping signal by use of a microcomputer, a monostable multivibrator and the like.

The switching circuit 42 selectively passes the first reproduced RF signal from the terminal 42a in the normal reproduction mode and during a time (low-level period of the switching signal b) in which no jump is made in the speed-change reproduction mode.

Figure 4:
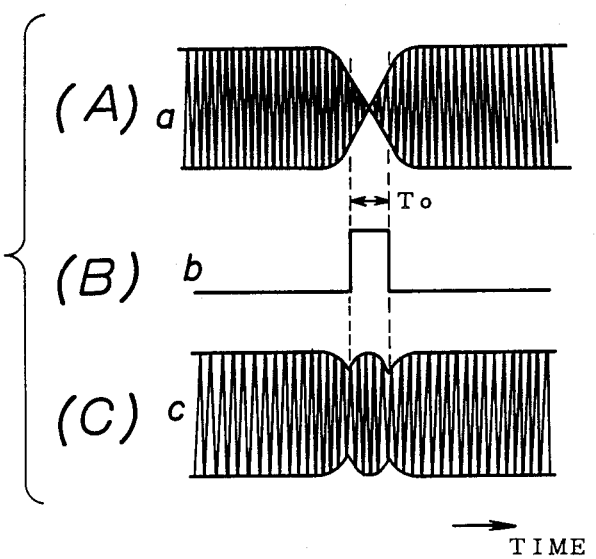
FIGS. 4(A) through 4(C) show signal waveforms at essential parts of the block system shown in FIG. 2 for explaining the operation thereof.

On the other hand, when a jump is made, the amplitude of the first reproduced RF signal greatly decreases. This decrease in the amplitude may be seen from FIG. 4(A) which shows the output first reproduced RF signal a of the delay circuit 35. As shown in FIG. 4(B), the switching signal b has the high level during the time in which the amplitude of the first reproduced RF signal a is smaller than a predetermined level. Accordingly, the switching circuit 42 selectively passes the second reproduced RF signal from the terminal 42b in place of the first reproduced RF signal a from the terminal 42a during the time To in which the amplitude of the first reproduced RF signal a falls under the predetermined level and the level of the switching signal b is high.

Therefore, a signal c shown in FIG. 4(C) is obtained from the switching circuit 42 and is outputted through an output terminal 44. The signal c is normally the first reproduced RF signal a but is the second reproduced RF signal during the time To in which the amplitude of the first reproduced RF signal a falls under the predetermined level. In other words, the signal c is compensated of the decrease in the amplitude of the first reproduced RF signal caused by the jump, and it is possible to considerably reduce the generation of noise caused by the jump compared to the conventional apparatus. As a result, the picture quality of the reproduced picture is greatly improved during the high-speed reproduction mode in the case where the video signal is pre-recorded on the optical disc as the main information signal.

According to the present embodiment, the reproduced RF signals are switched with the same switching timing when the jump is made in the forward direction and when the jump is made in the reverse direction, because the switching circuit 40 is provided. On the other hand, when the switching circuit 40 is not provided, the switching timing of the reproduced RF signals slightly differ between the cases where the jump is made in the forward direction and the jump is made in the reverse direction, due to the leading and lagging relationships of the beam spots S1 and S2 with respect to the beam spot M. However, this difference in the switching timing is an extremely short time and is negligible from the practical point of view.

In addition, the main information signal pre-recorded on the optical disc is of course not limited to the video signal.

In the present specification, the description and illustration of a demodulating system for demodulating the reproduced signal from the optical disc and the like are omitted because the remaining parts of the optical disc reproducing apparatus are not directly related to the subject matter of the present invention. However, the demodulating system and the like constituting the remaining parts of the optical disc reproducing apparatus are further disclosed in the U.S. patent application Ser. No. 073,019 filed July 14, 1987, the disclosure of which is hereby incorporated by reference.

Further, the present invention is not limited to these embodiments, but various variations and modifications may be made without departing from the scope of the present invention.

What is claimed is:

1. An optical disc reproducing apparatus for reproducing a pre-recorded signal from an intended track of an optical disc by detecting reflected light beams of a main light beam and sub light beams reflected from the optical disc, said main light beam being irradiated as a main beam spot on the track while said sub light beams are irradiated as sub beam spots at intermediate portions between two successive tracks one of which is said intended track, said optical disc reproducing apparatus having a speed-change reproduction mode in which the main beam spot jumps from said intended track to an adjacent track at a predetermined rate while maintaining a relative positional relationship of the main beam spot and the sub beam spots, said optical disc reproducing apparatus comprising:

first input terminal means for receiving a first reproduced signal detected from the reflected light beam of said main light beam reflected from the optical disc;

second input terminal means for receiving at least a second reproduced signal detected from the reflected light beam of one of said sub light beams reflected from the optical disc;

delay means for matching timings of the first and second reproduced signals by delaying at least one of the first and second reproduced signals; and selecting means supplied with the first and second reproduced signals from said delay means for selectively outputting the first reproduced signal during a time when no jump is made and for selectively outputting the second reproduced signal for a predetermined time after a jump starts.

2. An optical disc reproducing apparatus as claimed in claim 1 in which the sub beam spots comprise a leading beam spot and a lagging beam spot which respectively lead and lag the main beam spot by a specific time T in a scanning direction of the light beams.

3. An optical disc reproducing apparatus as claimed in claim 2 in which said second input terminal means receives the second reproduced signal of the sub light beam which forms the leading beam spot on the optical disc, said delay means comprising means for delaying at least the second reproduced signal so as to match timings of the first and second reproduced signals.

4. An optical disc reproducing apparatus as claimed in claim 2 in which said second input terminal means receives the second reproduced signal of the sub light beam which forms the lagging beam spot on the optical disc, said delay means comprising means for delaying at least the first reproduced signal so as to match timings of the first and second reproduced signals.

5. An optical disc reproducing apparatus as claimed in claim 2 in which said second input terminal means receives second reproduced signals of both the sub light beams which form the leading and lagging beam spots on the optical disc, said delay means comprising a first delay circuit for delaying the first reproduced signal by the specific time T and a second delay circuit for delaying the second reproduced signal of the sub light beam which forms the leading beam spot on the optical disc by a time 2T, said selecting means comprising a first switching circuit for selectively outputting one of the second reproduced signal of the sub light beam which forms the lagging beam spot on the optical disc and the second reproduced signal outputted from said second delay circuit and a second switching circuit for selectively outputting the first reproduced signal outputted from said first delay circuit during the time when no jump is made and for selectively outputting the second reproduced signal outputted from said first switching circuit for the predetermined time after the jump starts.

6. An optical disc reproducing apparatus as claimed in claim 5 in which said first switching circuit selectively outputs a fixed one of the second reproduced signal of the sub light beam which forms the lagging beam spot on the optical disc and the second reproduced signal outputted from said second delay circuit responsive to a jump instruction which instructs a jump in a forward direction.

7. An optical disc reproducing apparatus as claimed in claim 5 in which said first switching circuit selectively outputs a fixed one of the second reproduced signal of the sub light beam which forms the lagging beam spot on the optical disc and the second reproduced signal outputted from said second delay circuit responsive to a jump instruction which instructs a jump in a reverse direction.

8. An optical disc reproducing apparatus as claimed in claim 5 in which said second switching circuit selectively outputs the first reproduced signal outputted from said first delay circuit during the time when no jump is made and selectively outputs the second reproduced signal outputted from said first switching circuit for the predetermined time after the jump starts responsive to a switching signal which has a predetermined logic level for the predetermined time after the jump starts.

9. An optical disc reproducing apparatus as claimed in claim 5 in which the optical disc is a constant angular velocity system optical disc and said optical disc reproducing apparatus further comprises third terminal means for receiving a control signal indicative of a radial position of the main beam spot on the optical disc, said first and second delay circuits being variably controlled of the delay times T and 2T thereof responsive to the control signal so that a value of T decreases as the radial position of the main beam spot moves further away from a center of the optical disc.

10. An optical disc reproducing apparatus as claimed in claim 5 in which the optical disc is a constant linear velocity system optical disc and said optical disc reproducing apparatus further comprises third terminal means for receiving a control signal, said first and second delay circuits being controlled of the delay times T and 2T thereof responsive to the control signal so that a value of T is fixed to a constant value.

11. An optical disc reproducing apparatus as claimed in claim 1 in which said pre-recorded signal on the optical disc is a video signal.

* * * * *